Patented Oct. 28, 1941

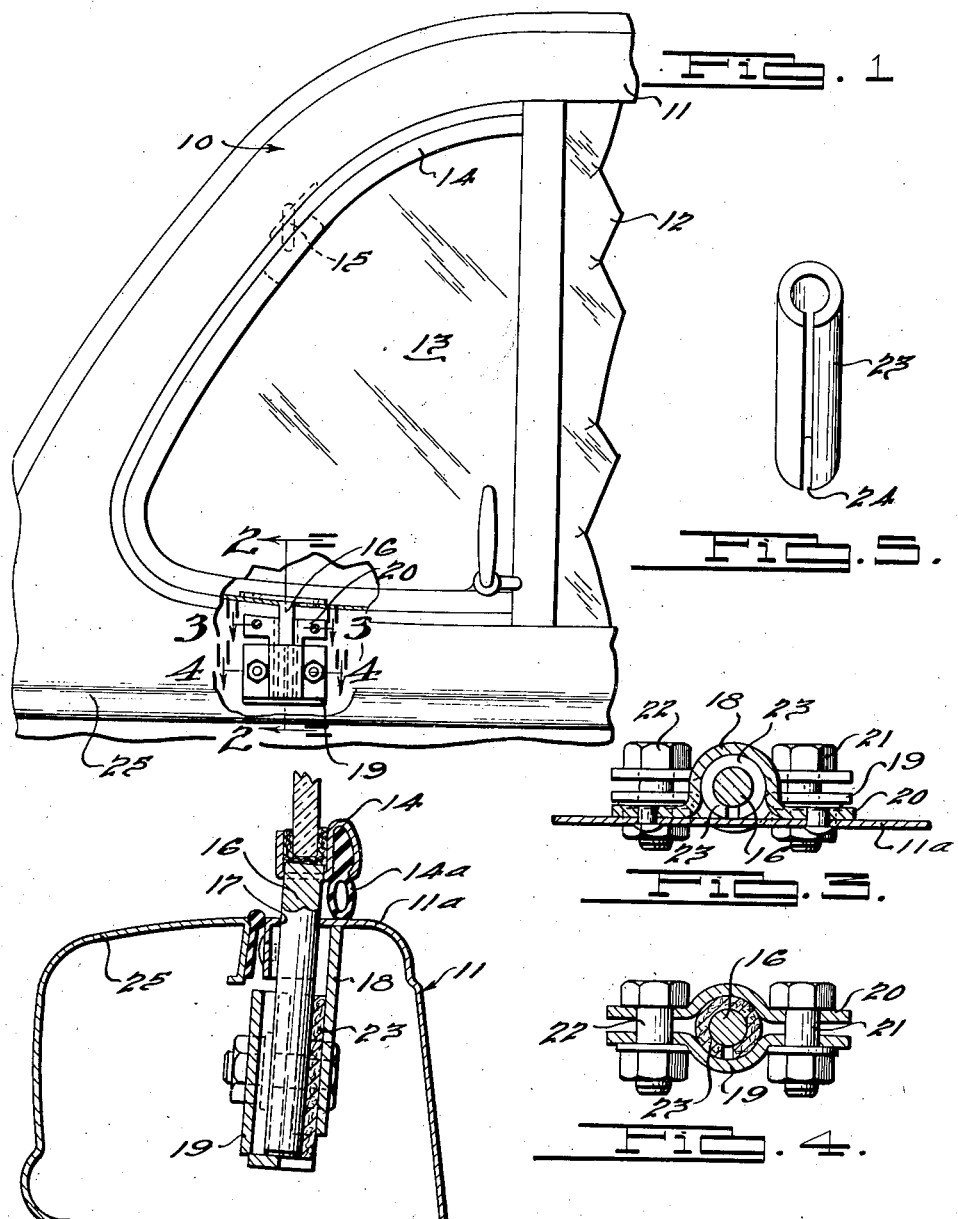

2,260,403

UNITED STATES PATENT OFFICE 2,260,403

MOTOR VEHICLE

Victor Preston, Detroit, Mich., assignor to L. A. Young Spring & Wire Corporation, Detroit, Mich., a corporation of Michigan Application January 26, 1940, Serial No. 315,674

2 Claims. (Cl. 16—140)

The present invention relates to motor vehicles and more particularly to a frictional pivot for use in connection with pivoting window constructions of the type used in ventilating the interior of closed vehicle bodies.

In the construction of ventilating windows used on certain types of closed vehicle bodies it is common practice to pivot a segment of the window in such a manner that it may be rotated about a substantially vertical axis to provide the desired ventilation of the vehicle body. In a construction of this type it is common practice to provide a frictional pivot which supports the frame of the pivoting segment of the window and permits its pivotal movement, while at the same time exerting a frictional force thereon which is sufficient to prevent an unintended pivotal movement of the window such as might occur by the pressure of the air against an extending portion of the window.

Heretofore such frictional pivots have consisted of a bracket member secured to some portion of the vehicle body and a depending stud which is secured to the frame of the segment of the window and is engaged by the bracket. In order to increase the frictional resistance against pivotal movement of the stud in the bracket, it has been common practice to provide a split bracket which may be clamped against the stud and in some instances a spring washer or a coil spring has been used to provide for a yielding connection at this point. In other instances attempts have been made to provide some sort of a bearing between the stud and the bracket. In either of the constructions the resultant connection was a metal to metal connection which required lubrication in order to permit a noiseless movement of the stud in the bracket and to prevent seizure of the stud by the bracket in such a manner as to prevent its pivotal movement relative thereto. Such constructions have further been unsatisfactory in that the metal to metal contact was such that as the parts wore, the frictional engagement of the stud decreased and sufficient play was provided between the stud and the bracket to cause a rattling during the operation of the vehicle.

It is therefore an object of the present invention to provide a frictional, oilless, antirattle pivotal connection between the pivoting segment of a window and the motor vehicle body, the said connection being designed in such a way as to provide for an adjustable and controlled amount of friction between the moving parts and the elimination of metal to metal contact between the moving stud and the clamping bracket member.

Another object of the invention is to provide a frictional pivot which is particularly adapted for mounting a pivoted window frame in a window opening and in which a movable member is secured to the window frame and a fixed bracket is secured adjacent the window opening and in which a frictional lining is disposed between the movable parts secured to the window frame and the fixed bracket secured adjacent the window opening.

A further object of the invention is to provide a frictional pivot of the type herein disclosed which is economical to manufacture, which has a relatively long service life, and which is readily adaptable for manufacture and instalation according to production methods.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a fragmentary elevation with parts broken away showing a portion of a vehicle door and a pivoting segment of the window placed therein;

Fig. 2 is a sectional view taken substantially on the line 2—2 of Fig. 1 in the direction of the arrows;

Fig. 3 is a sectional view taken substantially on the line 3—3 of Fig. 1 in the direction of the arrows;

Fig. 4 is a sectional view taken substantially on the line 4—4 of Fig. 1 in the direction of the arrows; and Fig. 5 is a view in perspective of the frictional sleeve forming a part of the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawing, a vehicle body 10, which is provided with a door 11, is provided with a window opening which receives a vertically movable sliding glass panel 12 and a pivotally mounted glass segment 13. The pivotally mounted glass segment 13 is provided with a marginal frame 14, carrying a weather seal 14a. The glass segment 13 may be mounted to move angularly by means of an upper pivotal connection 15 and a stud 16 which extends downwardly through an opening 17 in the door panel 11a forming a part of the door 11. The stud 16 is journaled in a bracket which consists of the fixed plate 18 having flanged portions 20. An adjustable plate 19 is provided to engage a sleeve 23 surrounding the stud 16 and is secured to the flanges 20 of the plate 18 by means of the nuts and bolts 21 and 22.

As shown in Figs. 3 and 4, a sleeve 23 preferably formed of a non-metallic vulcanized fibrous material, is interposed between the stud 16 and the bracket. The sleeve 23 is provided with a longitudinal slot 24 which permits the entire sleeve to be compressed to increase the frictional force exerted on the stud 16 carried by the pivoted window 13 upon tightening of the adjustable plate 19 forming a part of the bracket. In this manner the amount of friction exerted on the stud 16 may be varied and controlled to meet the requirements of any particular installation. The sleeve 23 may be formed of any desired material which is of a non-metallic nature and which is capable of increasing the frictional engagement of the stud 16 by the bracket, such for example as fibrous lining material.

In mounting the pivoted segment 13 in the door, the adjustable plate 19 is removed from the bracket and the stud 16 is inserted in the frictional sleeve member 23. The frictional member is then placed in contact with the fixed plate 18 of the bracket and the adjustable plate 19 is placed thereon and the nuts on the bolts 21 and 22 are tightened until angular movement of the pivoting window segment 13 is resisted by the desired degree of frictional force. After this operation has been completed, a garnish molding 25 may be placed on the interior of the door and the pivotal connection is completely concealed within the vehicle body. In the event that there is not sufficient frictional force exerted on the stud 16, the matter of adjustment is very simple since it is only necessary that the garnish molding 25 be removed and the nuts on bolts 21 and 22 be suitably adjusted to provide the desired degree of friction on the stud 16.

From the foregoing it will be apparent that the construction herein disclosed eliminates the need for lubrication between the parts and eliminates any direct metal to metal contact between the stud and the bracket; and also that the amount of frictional resistance to movement of the stud 16 in the bracket may be definitely controlled by the adjustment of the nuts on bolts 21 and 22. Since the inserted sleeve 23 is formed of a non-metallic material, there is no opportunity for the stud to be locked in the bracket due to rust, corrosion, or the like.

While the invention has been described with particular reference to a pivoted window of a vehicle door, it will be apparent that it is equally applicable to other portions of vehicles than pivoted door windows, and also to various types of vehicles such for example as aircraft, motor boats, trains, etc., as well as to any type of installation wherein it is desired to impose a frictional force to hold a pivoted window in a substantially fixed position until a predetermined force is exerted to move it to another position.

I claim:

1. Frictional pivot means for an angularly movable window of a motor vehicle door in which said door includes a metal stamping having a window opening formed therein for receiving said window, the combination of an upright pivoting stud projecting into the door stamping, a frictional oilless anti-rattle pivotal connection between the pivoting stud and said metal stamping, said connection comprising a base plate adapted to be carried by the metal stamping, an adjustable plate associated with the base plate, said plates having upright socket portions and laterally extending opposed relatively flat flanges at opposite sides of the socket portions, a non-metallic sleeve of friction material located within the socket portions and interposed between the base and adjustable plates and surrounding said pivoting stud, and manually operable means extending through the flanges of the adjustable and base plates on opposite sides of the stud and sleeve to vary the frictional force exerted by said sleeve.

2. A hinge device for pivotally mounting a window frame in the window opening of a motor vehicle body composed of stampings, the combination of an upright stud adapted to be secured to the window frame and to project into an opening formed in a body stamping, a clamping bracket adapted to receive and clamp said stud and having a body portion adapted to be secured to one of said stampings and a clamping portion adjustably connected with the body portion of said bracket, said body and clamping portions having opposed laterally extending relatively flat flange portions, a sleeve of non-metallic friction material interposed in said clamping bracket and surrounding said stud, and means located at opposite sides of said sleeve and stud and extending through said flange portions for adjusting said adjustable clamping portion to increase or decrease the frictional engagement between said stud and said sleeve.

VICTOR PRESTON.